United States Patent
Shanley, IV

(10) Patent No.: US 8,727,763 B2
(45) Date of Patent: May 20, 2014

(54) APPARATUS AND METHODS FOR SELECTIVE THERMOFORMING

(71) Applicant: William C. Shanley, IV, Malvern, PA (US)

(72) Inventor: William C. Shanley, IV, Malvern, PA (US)

(*) Notice: Subject to any disclaimer, the term of this patent is extended or adjusted under 35 U.S.C. 154(b) by 0 days.

(21) Appl. No.: 13/732,454

(22) Filed: Jan. 2, 2013

(65) Prior Publication Data

US 2013/0122134 A1 May 16, 2013

Related U.S. Application Data

(62) Division of application No. 13/008,066, filed on Jan. 18, 2011.

(60) Provisional application No. 61/350,107, filed on Jun. 1, 2010.

(51) Int. Cl.
*B29C 51/10* (2006.01)
*B29C 51/42* (2006.01)

(52) U.S. Cl.
CPC ............................ *B29C 51/426* (2013.01); *B29C 51/422* (2013.01)
USPC ........... 425/388; 425/383; 425/384; 425/385; 425/387.1; 264/522

(58) Field of Classification Search
CPC ............................ B29C 51/422; B29C 51/426
USPC ........ 425/383, 384, 385, 387.1, 388; 264/522
See application file for complete search history.

(56) References Cited

U.S. PATENT DOCUMENTS

| | | | |
|---|---|---|---|
| 3,217,462 A | 11/1965 | Watts, Jr. | |
| 4,878,579 A | 11/1989 | Hager | |
| 4,878,826 A | 11/1989 | Wendt | |
| 5,033,774 A | 7/1991 | Benardelli | |
| 5,798,079 A * | 8/1998 | Freek et al. | 264/554 |
| 6,102,686 A * | 8/2000 | Eschenfelder | 425/388 |
| 6,814,227 B2 | 11/2004 | Seligman et al. | |
| 8,061,512 B2 | 11/2011 | Thomas | |
| 8,215,479 B2 | 7/2012 | Willms et al. | |
| 2011/0290674 A1 | 12/2011 | Shanley et al. | |

FOREIGN PATENT DOCUMENTS

| | | |
|---|---|---|
| CH | 592953 | 11/1977 |
| EP | 0055082 | 6/1982 |
| GB | 784503 | 10/1957 |
| WO | 2011152964 | 12/2011 |

OTHER PUBLICATIONS

Office Action dated Apr. 26, 2013 in U.S. Appl. No. 13/008,066.

(Continued)

*Primary Examiner* — Joseph S Del Sole
*Assistant Examiner* — Lawrence D Hohenbrink, Jr.
(74) *Attorney, Agent, or Firm* — Kilpatrick Townsend & Stockton LLP; Dean W. Russell, Esq.

(57) ABSTRACT

Apparatus and methods of forming selected portions of integral sheets of material are disclosed. Unformed portions of the sheets may remain undistorted during the forming process, allowing them to contain text, art work, or other desired information without material risk of the information being degraded or becoming unintelligible during the forming process. This result may be accomplished, moreover, with less trim than usually occurs in conventional forming processes.

5 Claims, 6 Drawing Sheets

(56) References Cited

OTHER PUBLICATIONS

International Search Report and Written Opinion dated Aug. 31, 2011 in connection with International Patent Application No. PCT/US2011/036001.

Office Action dated Jan. 7, 2013 in U.S. Appl. No. 13/008,066.
Response dated Mar. 26, 2013 in U.S. Appl. No. 13/008,066.
International Preliminary Report on Patentability dated Dec. 13, 2012 in Application No. PCT/US2011/036001.

* cited by examiner

APPARATUS AND METHODS FOR SELECTIVE THERMOFORMING

CROSS-REFERENCE TO RELATED APPLICATIONS

This application is a divisional of U.S. patent application Ser. No. 13/008,066, filed Jan. 18, 2011, which is based on, claims priority to, and hereby refers to U.S. Provisional Patent Application Ser. No. 61/350,107, filed Jun. 1, 2010, the entire contents of both of which are incorporated herein by this reference.

FIELD OF THE INVENTION

This invention relates to shaping heated polymeric materials in a mold and more particularly, although not necessarily exclusively, to heating selected areas of the materials to forming temperatures while not forming other areas of the materials.

BACKGROUND OF THE INVENTION

Conventional thermoforming involves heating a polymer sheet to a pliable forming temperature (which depends at least in part on the type of sheet being heated), forming the sheet to a specific shape on a mold, and thereafter trimming unformed portions of the sheet to create a useful product. The sheet, sometimes referred to as "film" when thin gauges or certain types of materials are formed, is typically heated in an oven to the forming temperature so that it may be stretched into or onto a mold and then cooled to retain a finished shape. During the heating process, the entire sheet of material is heated to the forming temperature. Portions of the sheet that are not formed are usually referred to as "trim" and not reused until after further processing.

U.S. Pat. No. 4,878,826 to Wendt, the entire contents of which are incorporated herein by this reference, is one of many patents disclosing apparatus for thermoforming articles from sheets of plastic material. The apparatus of the Wendt patent may include both male and female molds together with a heating means and evacuation equipment. One such heating means is described as being hot oil circulating through an associated manifold such that it crystallizes a sheet of plastic material. See Wendt, col. 10, 11. 9-12. According to the Wendt patent, the sheet also may be pre-heated to 10-15% crystallization before entering the mold. See id., col. 12, 11. 50-57. Indeed, over-crystallization of the sheet apparently is an issue with the apparatus of the Wendt patent, requiring cold air to be injected into various mold cavities. See id., col. 13, 11. 53-65.

Thermoforming a plastic sheet necessarily distorts it. However, in some circumstances distortion of certain portions of a sheet is undesirable. As an example, distortion of portions of a sheet containing printing or art work may render them unintelligible or, at minimum, diminish their aesthetic appeal. Consequently, conventional thermoforming requires pre-printing of text and art in a distorted form so that the further distortion caused by the thermoforming can counteract the pre-distortion and, at least theoretically, produce intelligible images. Thus, providing apparatus and methods that would allow thermoforming of selected portions of a plastic sheet while avoiding distortion of other portions of the sheet thus would be a beneficial-albeit difficult-achievement.

SUMMARY OF THE INVENTION

The present invention accomplishes this desired result. Notwithstanding its use of an integral sheet of polymeric material, the present invention allows heating and forming of only selected portions of the material. By contrast, unformed portions of the material remain substantially undistorted and thus may contain undistorted printing, art work, or other text, symbols, or information without concern as to whether intelligibility of the information will be degraded during the forming process. Even if information is not present in unformed regions of a sheet, the mere fact that the unformed regions may retain their original shapes (typically but not necessarily flat) and thicknesses permits a broader range of products to be created. Further, apparatus and methods of the present invention admit productive use of the vast majority of each sheet (e.g. 95% in some cases), so that little trim is created when products are formed.

In at least some embodiments of the invention, energy-absorbing or -reflecting material may be employed to limit heat or other energy transferred to the polymer sheets. Such material may be in the form of metallic or other plates having simple or complex shapes. The plates may include cut-outs so that heat or other energy may be transferred efficiently to areas of a sheet that is to be thermoformed. Various embodiments of the invention also may utilize controllable banks of heaters to allow variable heating of the molds themselves.

It thus is an optional, non-exclusive object of the present invention to provide apparatus and methods for selectively thermoforming integral polymeric materials.

It is another optional, non-exclusive object of the present invention to provide apparatus and methods for thermoforming portions of a polymer sheet while not forming, or otherwise materially distorting, other portions of the sheet.

It is an additional optional, non-exclusive object of the present invention to provide apparatus and methods permitting text, art work, or other information to be printed on to-be-formed material in an undistorted manner yet remain intelligible post-forming.

It is also an optional, non-exclusive object of the present invention to provide apparatus and methods for selective thermoforming including use of mechanical heat-transfer barriers.

It is yet another optional, non-exclusive object of the present invention to provide apparatus and methods in which the heat-transfer barriers are in the form of plates having cut-outs through which heat may readily pass.

It is a further optional, non-exclusive object of the present invention to provide apparatus and methods for selective thermoforming using controllable banks of heaters to allow variable heating of the molds themselves.

It is, moreover, an optional, non-exclusive object of the present invention to provide apparatus and methods for selective thermoforming while limiting the amount of trim.

Other objects, features, and advantages of the invention will be apparent to persons skilled in the relevant art with reference to the remaining text and the drawings of this application.

DETAILED DESCRIPTION

Figure 1:
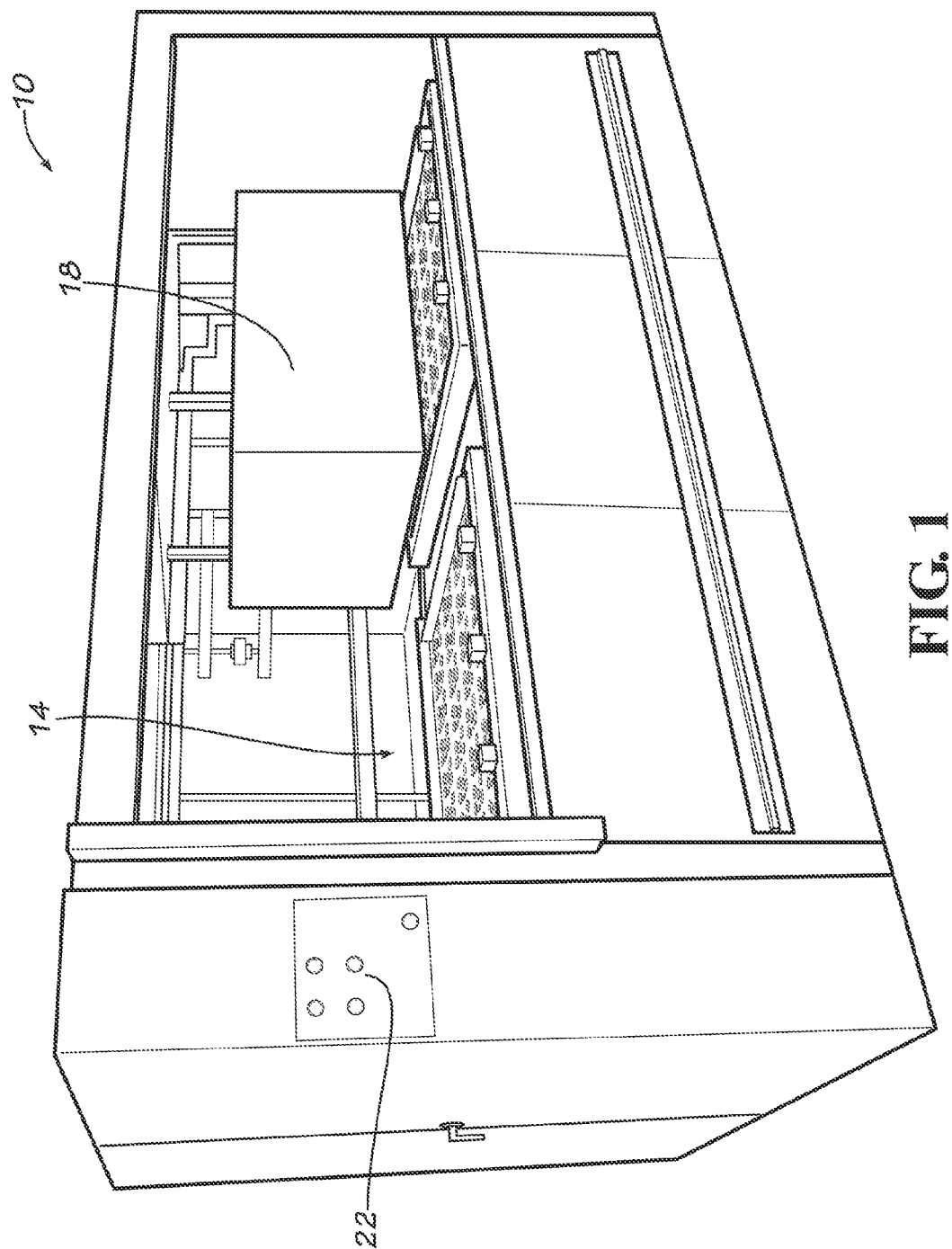
FIG. 1 is a perspective view of exemplary thermoforming apparatus useful as part of or in connection with the present invention.

Depicted in FIG. 1 is exemplary thermoforming apparatus 10. Apparatus 10 may be a conventional thermoforming machine, any number of which are available commercially. Preferably included as part of apparatus 10 are mold 14 (see also FIGS. 2-3) and heater 18. A computerized controller including actuating means 22 may, if desired, be connected to heater 18 to control aspects of its operation. Actuating means 22 may comprise one or more manual switches as shown in FIG. 1. Those skilled in relevant fields will recognize, however, that other manners of actuating heater 18 may be employed instead and that no controller is required.

Figure 2:
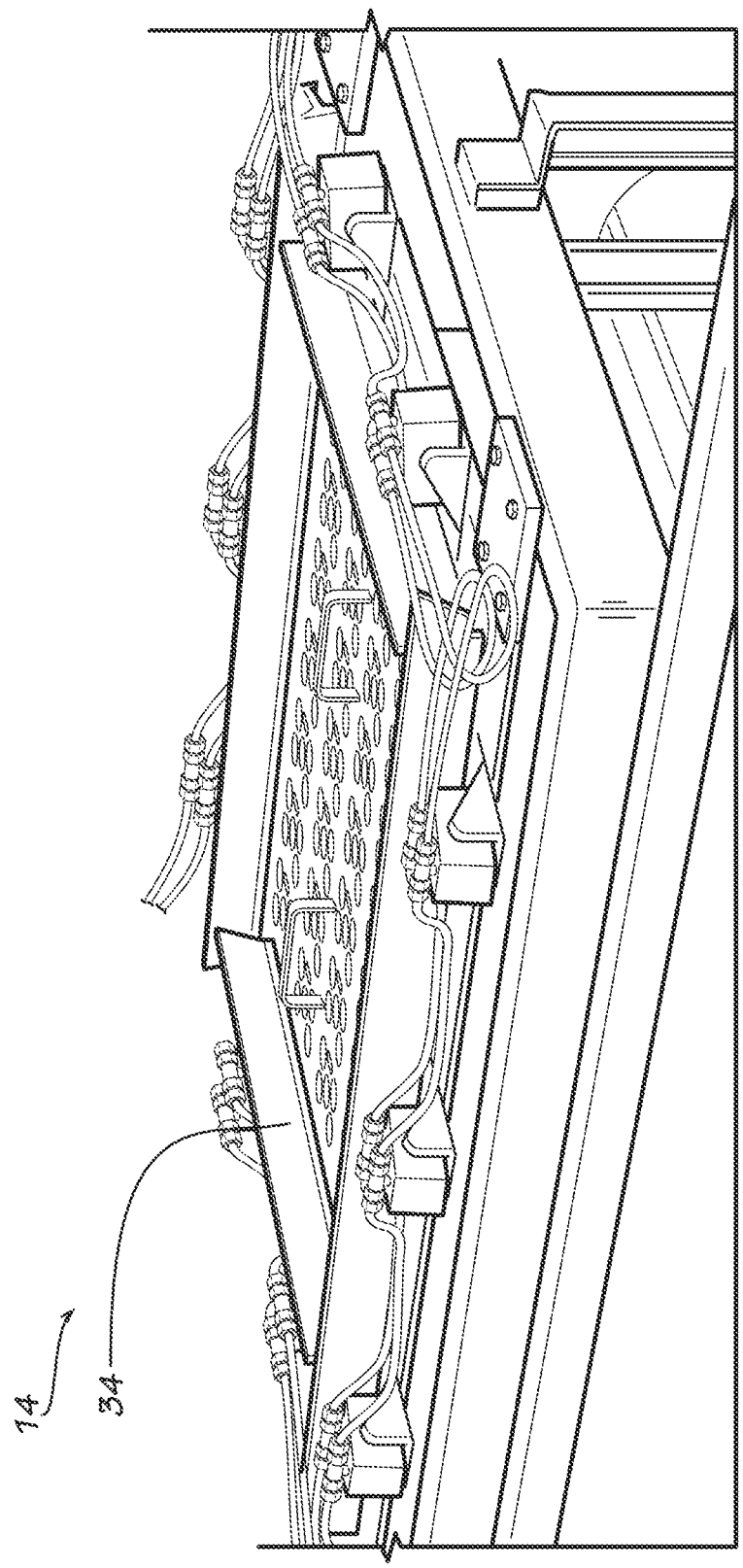
FIG. 2 is a perspective view of a portion of a mold comprising part of the apparatus of FIG. 1.
Figure 3:
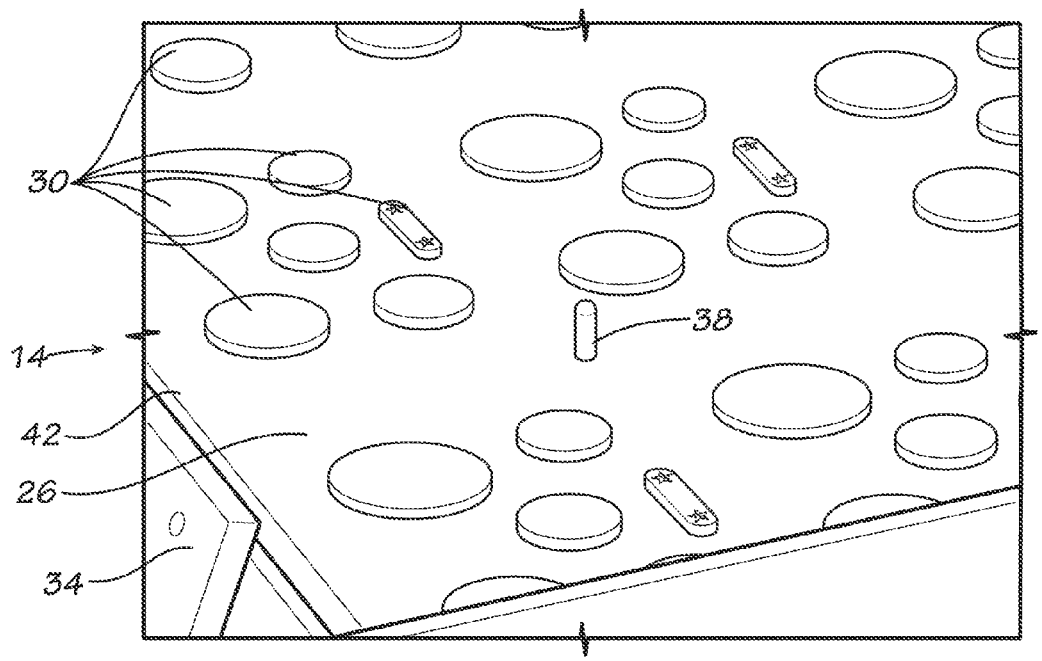
FIG. 3 is a close-up view of part of the mold portion of FIG. 2 illustrating especially various plugs protruding upward from its surface onto which a formable sheet may be placed.

Heater 18 preferably is positionable above mold 14 so as to supply heat only to one side of the mold 14, which itself may be heated. FIGS. 2-3 show aspects of an exemplary version of mold 14, which preferably (although not necessarily) is made of aluminum. Alternatively, mold 14 may be of composite type with both male and female components. As illustrated particularly in FIG. 3, mold 14 may comprise a generally planar upper surface 26 from which one or more plugs 30 protrude. In use of apparatus 10, plugs 30 function as three-dimensional objects about which sheets of polymer material are formed.

Figure 8A:
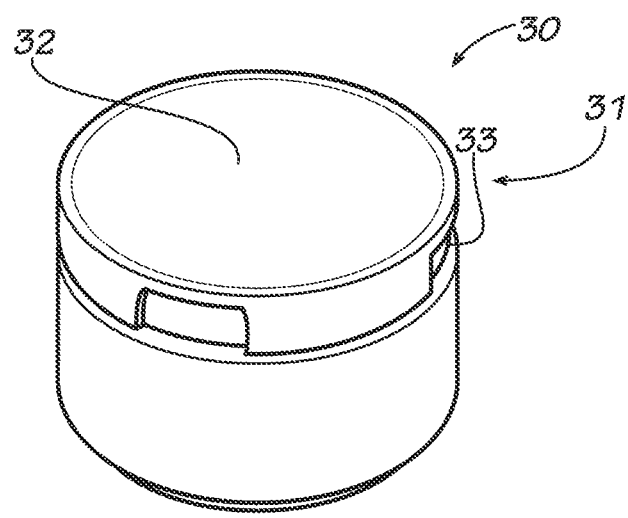
FIGS. 8A-C are various views of a plug consistent with FIG. 3.
Figure 8B:
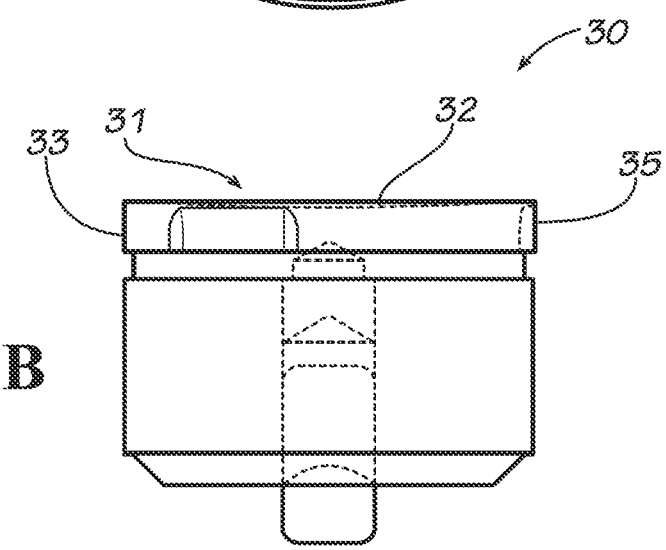
Figure 8C:
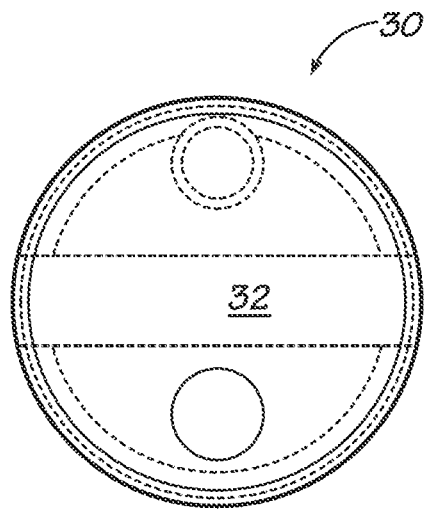

FIGS. 8A-C illustrate aspects of an exemplary plug 30. Plug 30 may, if desired, be shaped generally as a cylinder and include section 31 comprising upper surface 32 together with side 33. Formed in side 33 may be one or more notches 35. At least two, and preferably three (or more) such notches 35 are incorporated into side 33, with the notches 35 preferably (although not necessarily) being angularly spaced evenly about the circumference of plug 30. For example, if plug 30 includes three notches 35, each notch 35 may be spaced one hundred twenty degrees (120°) from adjacent notches 35. As depicted in the side view of FIG. 8B, notches 35 need not extend completely to upper surface 32—although they may do so if desired.

Also detailed in FIGS. 2-3 as part of mold 14 are clamps 34 and alignment pins 38. Clamps 34 surround some or all of perimeter 42 of mold 14 and retain to-be-formed material in place relative to upper surface 26. Pins 38, which like plugs 30 extend upward from upper surface 26, facilitate alignment of the to-be-formed material relative to the plugs 30.

Figure 4:
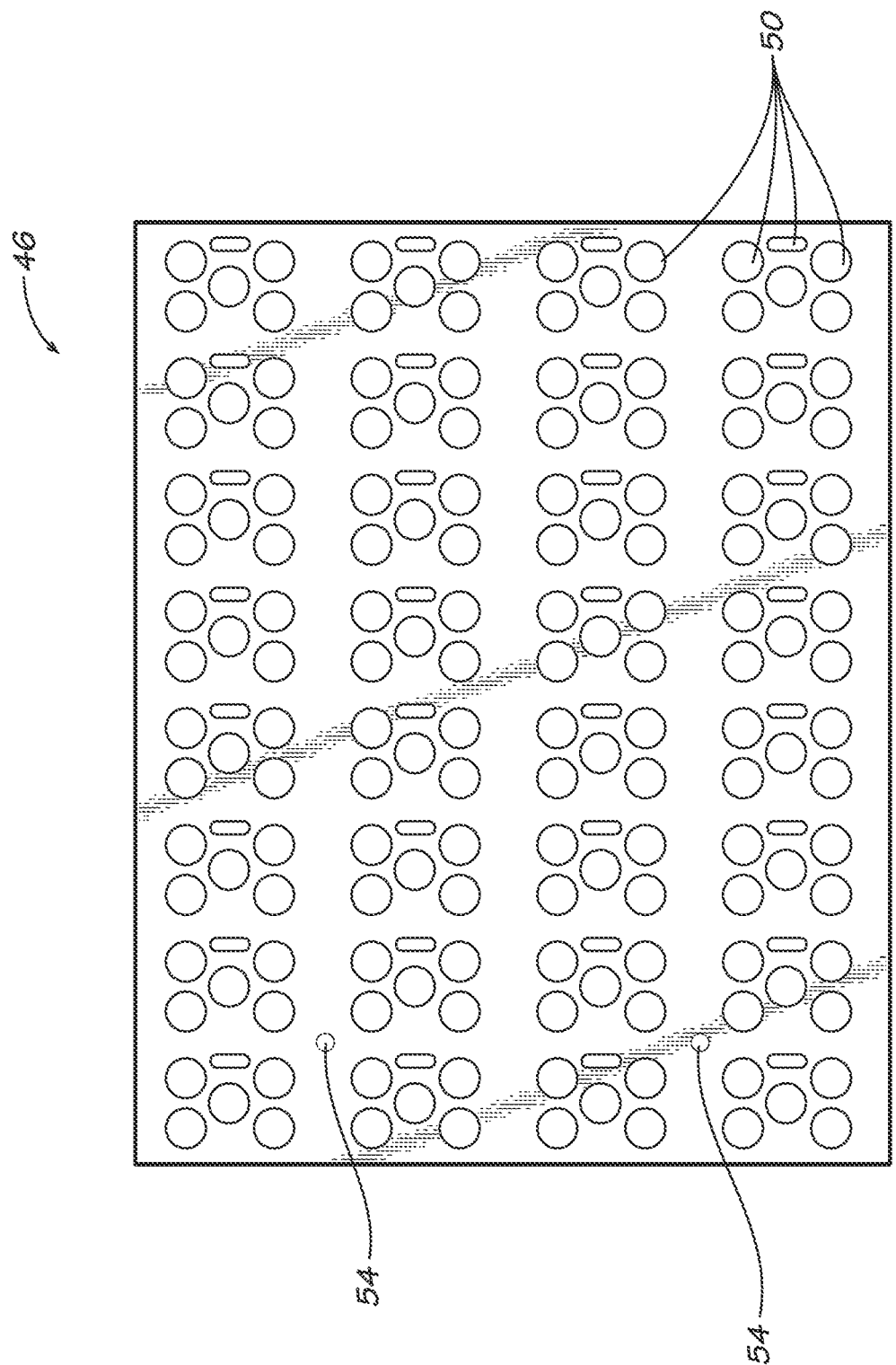
FIG. 4 is a generally elevational view of an exemplary heat-sinking plate that may comprise part of the present invention.

An exemplary heat sink 46 appears in FIG. 4. Sink 46 may be sized and shaped in any appropriate manner and may be made of any suitable heat-absorbing (or -reflecting) material. Preferably, however, sink 46 conforms to the shape of the corresponding mold or surface to be heated; as shown in FIG. 4, exemplary sink 46 is in the form of a generally rectangular, generally planar aluminum plate. Consistent with the present invention, sink 46 may include one or more cut-outs 50 through its depth, each of which preferably is approximately the size and shape of an associated plug 30. Sink 46 additionally may include openings 54 for receiving alignment pins 38.

Apparatus 10 may be utilized with any thermoformable material. For certain purposes identified herein, however, the material beneficially is polyethylene terephthalate ("PET"), a polymeric plastic resin. Additionally beneficial for various of these purposes is that the PET be transparent. Again, though, the thermoformable material need not necessarily be clear or transparent, nor need it be PET. For ease of handling, the material advantageously may be preformed into a generally planar sheet of predetermined size and shape.

Among products usefully created using the present inventive techniques are plastic display holders for coins or souvenirs. Collector-quality versions of such holders may, and indeed typically, include color printing, art work, and text in unformed regions. By contrast, formed regions—into which coins are placed-preferably remain clear so as not to impede viewing of the coins. In some cases the holders may be combined back-to-back or placed within clear housings for further protection of the coins. Objects other than coins or souvenirs may be displayed, and products other than display holders may be created, however, as should be apparent to persons skilled in the art.

According to at least one method of the present invention, mold 14 may be heated to a preset temperature. The temperature may be selected so as to allow thermoformable material to be formed by the mold 14 and so as to be sufficient to remove heat from the material. Preferably, however, the selected temperature is such that warping or chill marks will not be formed on or in the material.

After mold 14 is heated adequately, a sheet of material containing undistorted color printing, art work, or text (or combinations thereof) may be laid onto upper surface 26 of mold 14. For at least some display holders, up to six colors may be printed on each side of the sheet, with opaque material (text and art work) then printed over the printed colors. Of course, any or all of the printed matter may be omitted if not needed in the final product. Nevertheless, when present, the printed matter need not be pre-distorted, as it is not subject to material distortion during the forming process.

Assuming the above-described coin display holders are to be created, the sheet preferably contains openings through its depth for receiving alignment pins 38, with the openings themselves positioned so that, when pins 38 are received, unprinted (clear) areas of the sheet are positioned on upper surface 26 atop some or all of plugs 30. Clamps 34 may then be employed to secure the periphery of the sheet against upper surface 26. Thereafter, sink 46 may be placed atop the sheet, with its openings 54 likewise receiving alignment pins 38 and at least some of its cut-outs 50 aligned with clear areas of the sheet. So placing sink 46 effectively sandwiches the sheet between mold 14 and sink 46, precluding its longitudinal and lateral movement.

Following placement of the sheet relative to mold 14, heater 18 is repositioned closely above sink 46 and activated for a selected period of time. Continuing with the display holder example, heater 18 may be activated for approximately thirty seconds. Heat or other energy from heater 18 transfers to sink 46 and, where cut-outs 50 in sink 46 exist, to (clear) areas of the sheet therewith aligned, where it is absorbed by the polymeric material.

Figure 5:
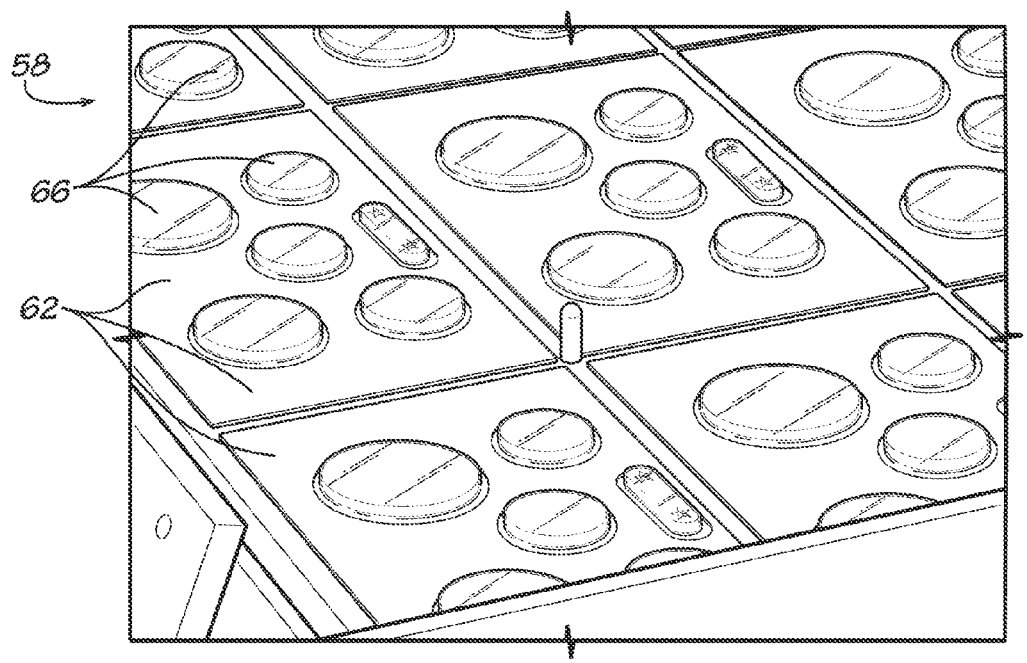
FIG. 5 is a close-up view illustrating a formed polymer sheet contacting the mold part of FIG. 3.
Figure 6:
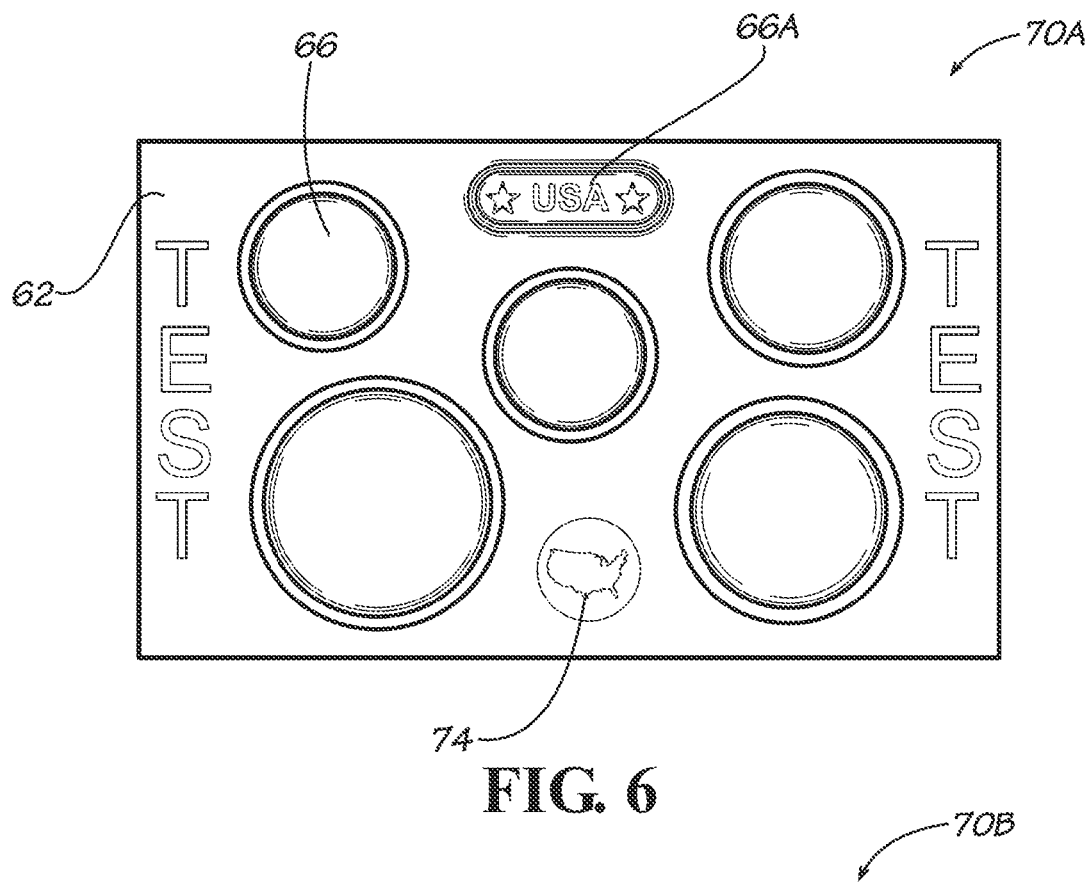
FIG. 6 is a generally elevational view of an exemplary product thermoformed in the manner of the present invention.
Figure 7:
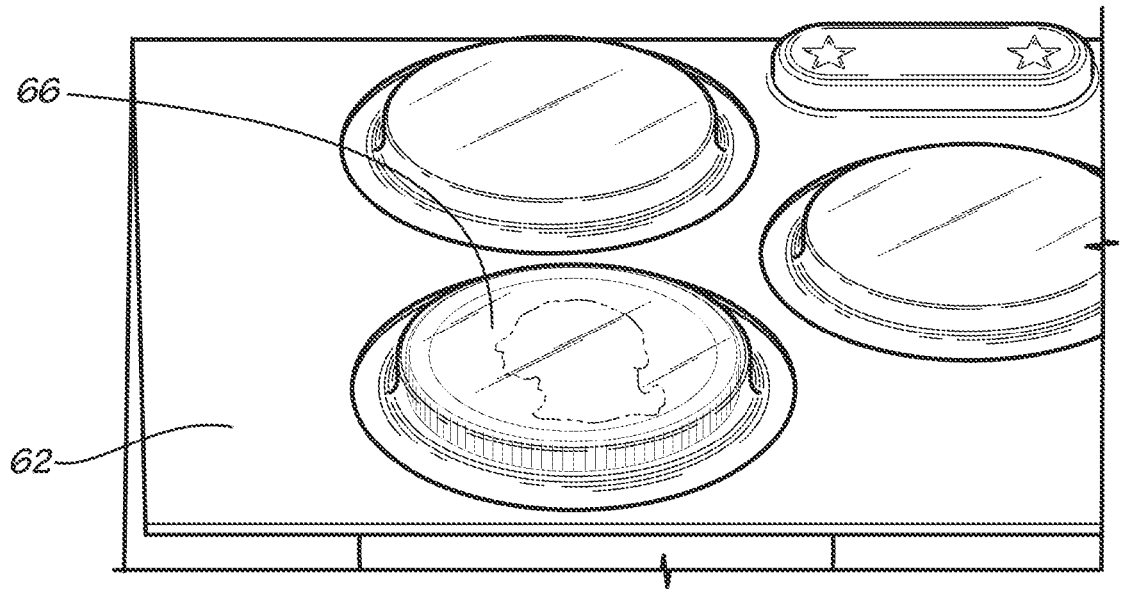
FIG. 7 is a generally side (edge) view of an exemplary product similar to that shown in FIG. 6.

As the exposed areas of the sheet absorb sufficient heat to reach their forming temperatures, mold 14 is evacuated so as to stretch (form) the material around plugs 30. Heater 18 then may be repositioned away from mold 14, the formed sheet of material may be allowed to cool, and sink 46 may be removed so as to expose the sheet of material. FIG. 5 illustrates material 58 in this exposed state, with the material 58 including (in this example) both unformed portions 62 and formed portions 66. The sheet of material 58 thereafter may be removed from mold 14 and, if appropriate, divided into display holders, examples of which (designated 70A and 70B) are depicted in FIGS. 6-7. Moreover, because only the periphery of material 58 was clamped during the forming process and need be trimmed, the vast remaining majority of the material 58 was available to create products. The processes of the invention may be repeated for any number of sheets of material.

Exemplary holder 70A includes six formed portions 66, five generally circular in shape and configured to receive a coin for display (see, e.g., FIG. 7). In FIG. 6, the sixth formed portion (66A) of holder 70A includes embossed letters "USA." By contrast, many of unformed portions 62 include color printing, with additional text and art work 74 printed thereon. Distortion-free text spelling "TEST" in printed areas of unformed portions 62 renders apparent the fact that the portions 62 did not distort while portions 66 were forming. Because holder 70A is merely one of many examples of holders capable of being made by the present invention, in no way is the invention limited to holders having any particular number or type of formed portions 66 or unformed portions 62. (Further, although not presently preferred, any of portions 66 may include distorted printing that becomes more legible when portions 66 are formed.)

Because plugs 30 may include notches 35 against which material 58 may be fashioned, formed portions 66 may include a corresponding number of "crush tabs" or "click-in features" protruding inward into the coin-receiving regions. These tabs provide some tolerances for portions 66. If, for example, a portion 66 is slightly larger in diameter than a to-be-received coin, the coin, when inserted, may (frictionally) bear against the inwardly-protruding tabs to be retained in position. If unneeded, the tabs will be crushed or otherwise deformed upon insertion of the coin so as not to impede its retention.

The foregoing is provided for purposes of illustrating, explaining, and describing embodiments of the present invention. Modifications and adaptations to these embodiments will be apparent to those skilled in the art and may be made without departing from the scope or spirit of the invention.

What is claimed is:

1. Apparatus for thermoforming a plastic material, comprising:
   a. a mold (i) configured to be evacuated, (ii) defining an upper surface, and (iii) comprising at least one plug protruding from the upper surface, the plug having an upper surface and being generally cylindrical in shape with at least one circumferential notch that does not extend to the upper surface of the plug;
   b. means for positioning a plastic material adjacent the mold, the plastic material defining integral first and second regions; and
   c. means for selectively heating the first region to its forming temperature while maintaining the second region at less than its forming temperature when the plastic material is positioned adjacent the mold so as to thermoform the first region but not thermoform the second region following evacuation of the mold, the selective heating means including (i) a source of energy and (ii) an energy sink having (A) a depth and (B) at least one cut-out extending through the depth.

2. Apparatus according to claim 1 in which the energy sink is configured so that the at least one cut-out may be aligned with the plug.

3. Apparatus according to claim 2 further comprising the plastic material positioned between the energy sink and the upper surface of the mold.

4. Apparatus according to claim 1 in which the at least one circumferential notch is configured to create a crush tab in the first region when the first region is thermoformed.

5. Apparatus for thermoforming a portion of a plastic holder of at least one coin having generally circular cross-section without materially distorting printing on the plastic holder, comprising:
   a. a mold (i) configured to be evacuated, (ii) defining a first surface, and (iii) comprising:
      (A) a plug protruding from the first surface, the plug being generally cylindrical in shape having (1) a generally circular cross-section of diameter D, (2) an upper surface, and (3) a side with at least one circumferential notch not extending to the upper surface; and
      (B) an alignment pin protruding from the first surface;
   b. means for positioning the plastic holder adjacent the mold, the plastic holder comprising integral first and second regions, (i) the first region having generally circular cross-section and (ii) the second region having printing thereon subject to material distortion if the second region is heated to its forming temperature;
   c. an energy sink comprising (i) a metal plate having a depth and a cut-out extending through the depth, the cut-out (A) having generally circular cross-section of approximately diameter D and (B) horizontally aligned with the plug when thermoforming occurs, and (ii) an opening horizontally aligned with the alignment pin when thermoforming occurs;
   d. a source of energy cooperating with the energy sink to heat the first region to its forming temperature while maintaining the second region at less than its forming temperature; and
   e. a computerized controller comprising means for activating the source of energy.

* * * * *